United States Patent

Frame

[11] Patent Number: 5,291,651
[45] Date of Patent: Mar. 8, 1994

[54] O.D. GRIPPER

[75] Inventor: Howard M. Frame, Jasper, Tenn.

[73] Assignee: Combustion Engineering, Inc., Windsor, Conn.

[21] Appl. No.: 95,825

[22] Filed: Jul. 21, 1993

Related U.S. Application Data

[63] Continuation of Ser. No. 843,613, Feb. 28, 1992, abandoned.

[51] Int. Cl.$^5$ .................................................. B23P 15/26
[52] U.S. Cl. ....................................... 29/726; 29/723; 29/890.043
[58] Field of Search .............. 29/726, 727, 723, 726.5, 29/890.043, 402.03; 376/260

[56] References Cited

U.S. PATENT DOCUMENTS

| | | | |
|---|---|---|---|
| Re. 25,680 | 11/1964 | Brown | 254/29 R |
| 3,325,146 | 6/1967 | Ahl | 254/106 |
| 3,986,583 | 10/1976 | Kinzbach | 254/29 R |
| 4,095,335 | 6/1978 | Lassarat . | |
| 4,162,704 | 7/1979 | Gunther | 254/29 R |
| 4,406,856 | 9/1983 | Wilkins et al. . | |
| 4,427,180 | 1/1984 | Brieuc | 254/106 |
| 4,586,695 | 3/1986 | Miller | 254/106 |
| 4,627,155 | 12/1986 | Mancabelli . | |
| 4,651,400 | 3/1987 | Shields | 29/723 |
| 4,670,975 | 6/1987 | Dettinger . | |
| 4,673,544 | 6/1987 | Rohr | 29/723 |
| 4,772,446 | 9/1988 | Meuschke | 29/723 |
| 5,025,854 | 6/1991 | Richter et al. | 29/723 |

FOREIGN PATENT DOCUMENTS

| | | |
|---|---|---|
| 0169471 | 1/1986 | European Pat. Off. . |
| 0347584 | 12/1989 | European Pat. Off. . |
| 2384594 | 10/1978 | France . |
| 2084542 | 4/1982 | United Kingdom . |
| WO9004492 | 5/1990 | World Int. Prop. O. . |

Primary Examiner—Irene Cuda
Attorney, Agent, or Firm—L. James Ristas; John H. Mulholland

[57] ABSTRACT

Apparatus (100) for pulling a projecting tube (14) from a tube sheet (12), along the tube axis (18), comprising a base (200) for engaging the tube sheet and a jacking assembly (300) mounted on the base and actuable by a first fluid pressure variation between extended and retracted positions (302) away from and toward the base respectively. A substantially annular gripper assembly (400) is connected to the jacking assembly for extended and retracted movement therewith and adapted to coaxially receive the tube. The gripper assembly includes a housing (404) having a gripper piston chamber (410) in which a second fluid pressure variation can be introduced into the gripper piston chamber. A gripper piston 420 is situated for movement in the gripper piston chamber in response to the second fluid pressure in the chamber. The gripper piston includes a substantially annular body portion (422) having a bearing surface (436) facing the axis, a gripper (402) supported in contact (434) with the body portion bearing surface, for movement toward the axis to engage and grip the tube in response to the movement of the gripper piston when the second fluid pressure increases in the gripper piston chamber, and first and second fluid pressure ports (226, 418) associated respectively with the jacking assembly and the gripper assembly, whereby the gripper piston can be actuated and the jacking assembly extended to grip and pull the tube.

17 Claims, 5 Drawing Sheets

O.D. GRIPPER

This is a continuation of copending application Ser. No. 843,613 filed Feb. 28, 1992, abandoned.

BACKGROUND OF THE INVENTION

The present invention relates to remotely operated tooling, and more particularly, to apparatus for remotely gripping and pulling a tube through the tube sheet of a nuclear steam generator.

Nuclear steam generators are massive heat exchangers in which thousands of tubes are supported within a large pressure vessel such that primary water at high temperature and pressure, passes through the tubes and thereby transfers heat to the secondary water outside the tubes, which is transformed into steam. The tubes are supported at their open ends in a thick plate, or tube sheet, at the lower head or bowl of the steam generator vessel.

For reasons that are well known in the field of nuclear steam generator servicing, the need sometimes arises to remove certain defective tubes from the steam generator. Because primary side water contains radioactive material which, over time, deposits in the tubes and in the lower head, direct human presence in the head to accomplish the tube removal should be minimised.

SUMMARY OF THE INVENTION

Accordingly, it is an object of the present invention to provide an apparatus which can remotely grip and pull a tube or rod through a plate in which such tube or rod is supported.

It is another object to provide apparatus for gripping and pulling individual tubes through the tube sheet of a nuclear steam generator.

A more particular object is to provide a gripper mechanism which can be utilised in conjunction with a jacking mechanism, to pull a rod or tube through a support plate.

In the tube gripper embodiment of the invention, a substantially annular housing is provided, defining a central longitudinal axis along which the tube is to enter the apparatus. The housing has first and second longitudinal ends and a substantially annular piston chamber, preferably having first and second spaced apart surfaces oriented transversally to the axis and a third surface extending between the first and second surfaces in parallel with the axis. A fluid inlet conduit is connected to the piston chamber for controling the pressure therein. A piston member for displacement in the housing in response to the fluid pressure in the chamber includes a substantially annular body portion situated in the chamber, and a neck portion extending rigidly from the body portion between the housing and the axis. First and second piston seals are provided between the body portion and the chamber, and between the neck portion and the housing, respectively. Gripper means, preferably in the form of segmented gripper members, are supported between the piston body portion and the axis, for displacement toward the axis to engage and grip the tube, in response to the displacement of the piston member toward the second end of the housing when the fluid pressure increases in the piston chamber.

In the preferred embodiment, the tube gripper is part of an apparatus for engaging and then pulling a projecting rod or tube through a support plate. In this embodiment, the apparatus includes (1) a base means for engaging the support plate, (2) a jacking assembly mounted on the base means and actuable by a first fluid pressure variation between extended and retracted positions away from and towards the base means, and (3) a substantially annular gripper assembly connected to the jacking assembly for extended and retracted movement therewith, and adapted to coaxially receive and grip the tube. The gripper assembly includes a housing having a gripper piston chamber and fluid inlet means in fluid communication with the gripper piston chamber, whereby a second fluid pressure variation can be introduced into the gripper piston chamber. Gripper piston means are provided for movement in the gripper piston chamber in response to the second fluid pressure. The gripper piston means include a substantially annular body portion having a bearing surface facing the axis. Gripper means are supported in contact with the body portion bearing surface, for movement toward the axis to engage and grip the tube in response to the movement of the gripper piston means when the second fluid pressure increases in the gripper piston chamber. First and second fluid pressure ports are associated respectively with the jacking assembly and the gripper assembly, whereby the gripper piston can be actuated and the jacking assembly extended, to grip and pull the tube. Preferably, the jacking assembly includes two laterally spaced-apart, fluidly actuable jacking piston members and a yoke rigidly connected between the moving parts of the jacking piston members. The gripper assembly is rigidly connected to the yoke for movement therewith.

The present invention provides advantages relative to the conventional technique of usiing an internal gripper or threaded full rod (with spacers). These advantages in the context of steam generator servicing include elimination of the spacers, reduced radiation exposure to service technicians, and time savings.

BRIEF DESCRIPTION OF THE DRAWINGS

These and other objects and advantages of the present invention will be described below with reference to the accompanying drawings, in which like numerals represent similar structures, and in which.

DESCRIPTION OF THE PREFERRED EMBODIMENT

Figure 1:
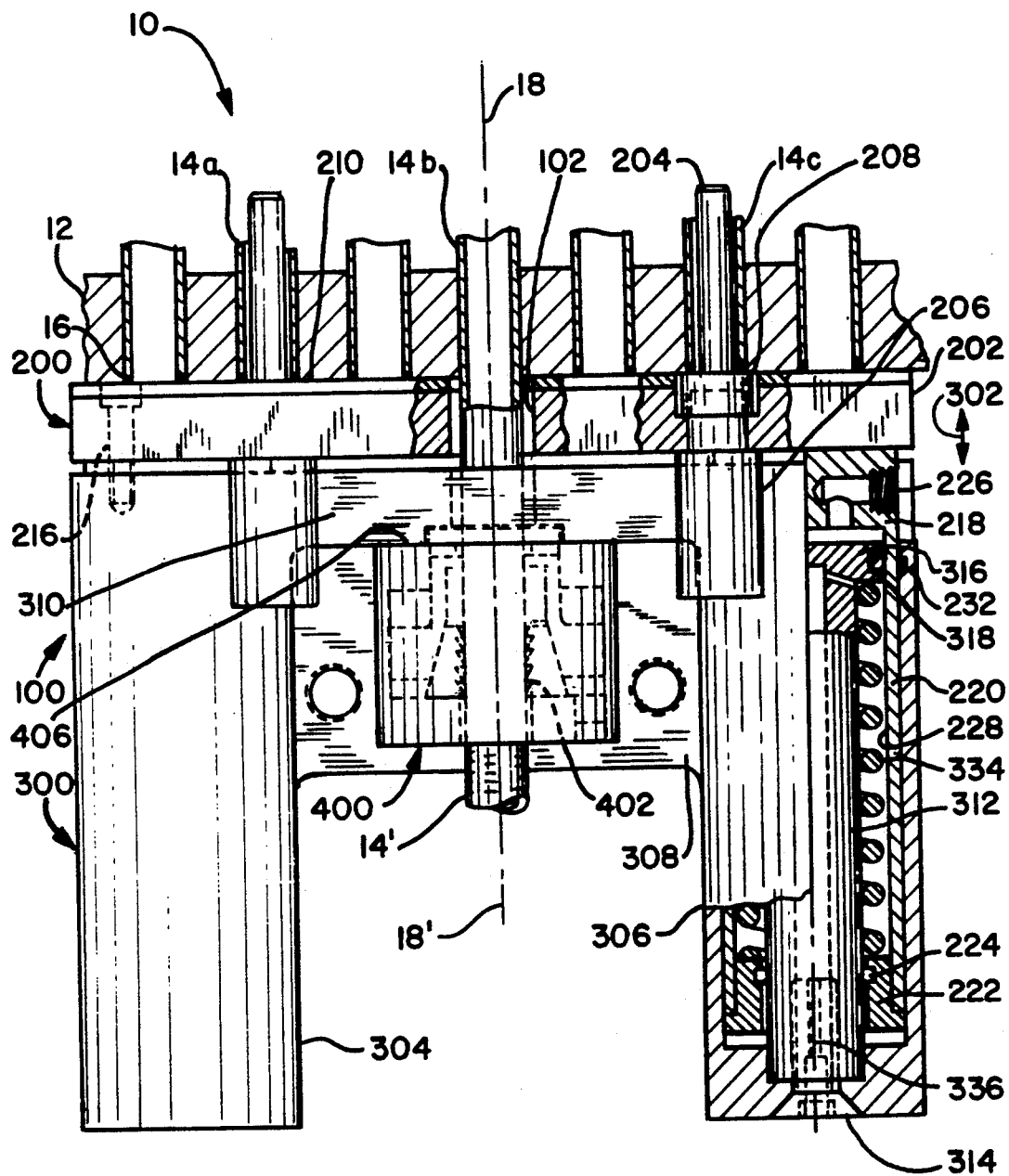
FIG. 1 is an elevation view of the preferred embodiment in registry with a tube during removal from a tube sheet.

FIG. 1 shows a portion of the lower head 10 of a nuclear steam generator, in particular, a tube sheet or plate 12 in which a multiplicity of tubes such as 14a, 14b, and 14c are supported in a substantially uniform array. Typically, the tube ends are welded, as at 16, to the lower surface of the tube sheet.

In the present example, the entire tube 14b is to be removed from the tube sheet 12, by a downward pulling force along the tube axis 18. The pulling is performed by the inventive apparatus 100 shown in FIG. 1, as described more fully below. Before the tube is pulled, however, a conventional tool (not shown) is passed upwardly within the tube to sever the tube at a high elevation in the steam generator, and the weld at the tube sheet is removed. Another conventional tool (not shown) is placed a short distance within the tube and, after bias against the tube wall, is pulled downwardly to expose the end 14' of the tube below the tube sheet 12.

The apparatus 100 in accordance with the preferred embodiment of the invention, includes three major assemblies: the base assembly 200, the jacking assembly 300, and the gripper assembly 400. In general, the apparatus is aligned so that a central bore 102 registers coaxially with the tube axis 18. The apparatus 100 is then telescopically passed over the protruding tube portion 14' until the base assembly 200 contacts, and preferably attaches to tube sheet 12. In the illustrated embodiment, the base assembly frame 202 carries at least one finger member 204 or the like, having actuator 206 connected to frame by nut 208. The fingers fit into respective tubes 14a, 14c and upon actuation, firmly engages the tubes, thereby supporting the apparatus 100 beneath the tube sheet 12. Such attachment means are well known in this field.

The jacking assembly 300 is connected to the base assembly 200 in a manner which permits extension and retraction of at least a portion of the jacking assembly, i.e., in the direction shown by arrow 302.

The gripper assembly 400 is connected to the portion of the jacking assembly that can be extended and retracted, so that the gripper assembly 400 also moves toward and away from the tube sheet 12. The gripper assembly 400 includes gripper members 402 (shown in phantom) which, in a manner to be described more fully below, can be actuated to move radially towards the tube axis 18, thereby engaging the outer diameter of the tube.

By appropriately sequencing fluid pressure to the jacking assembly 300 and gripper assembly 400, (1) the gripper members 402 engage the tube, (2) a portion of the jacking assembly 300 extends away from the tube sheet, thereby also moving the gripper assembly and tube away from the tube sheet, (3) the gripper members 402 are then released, and (4) the gripper assembly 400, along with the retracting portion of the jacking assembly 300 move toward the tube sheet. The cycle (1)–(4) can be repeated to incrementally pull the tube out of the tube sheet with several tons of force.

Figure 2:
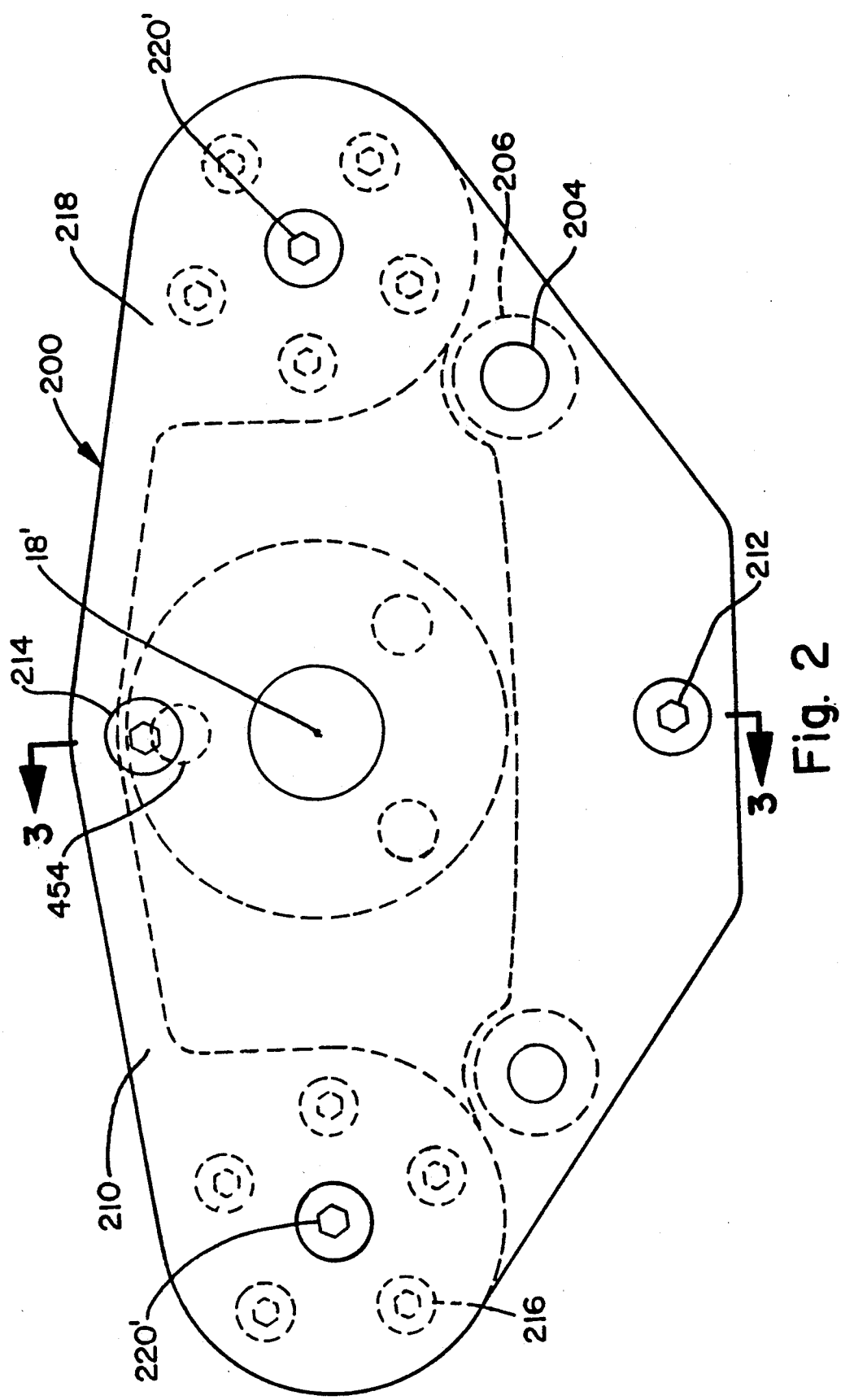
FIG. 2 is a plan view of the apparatus of FIG. 1.
Figure 3:
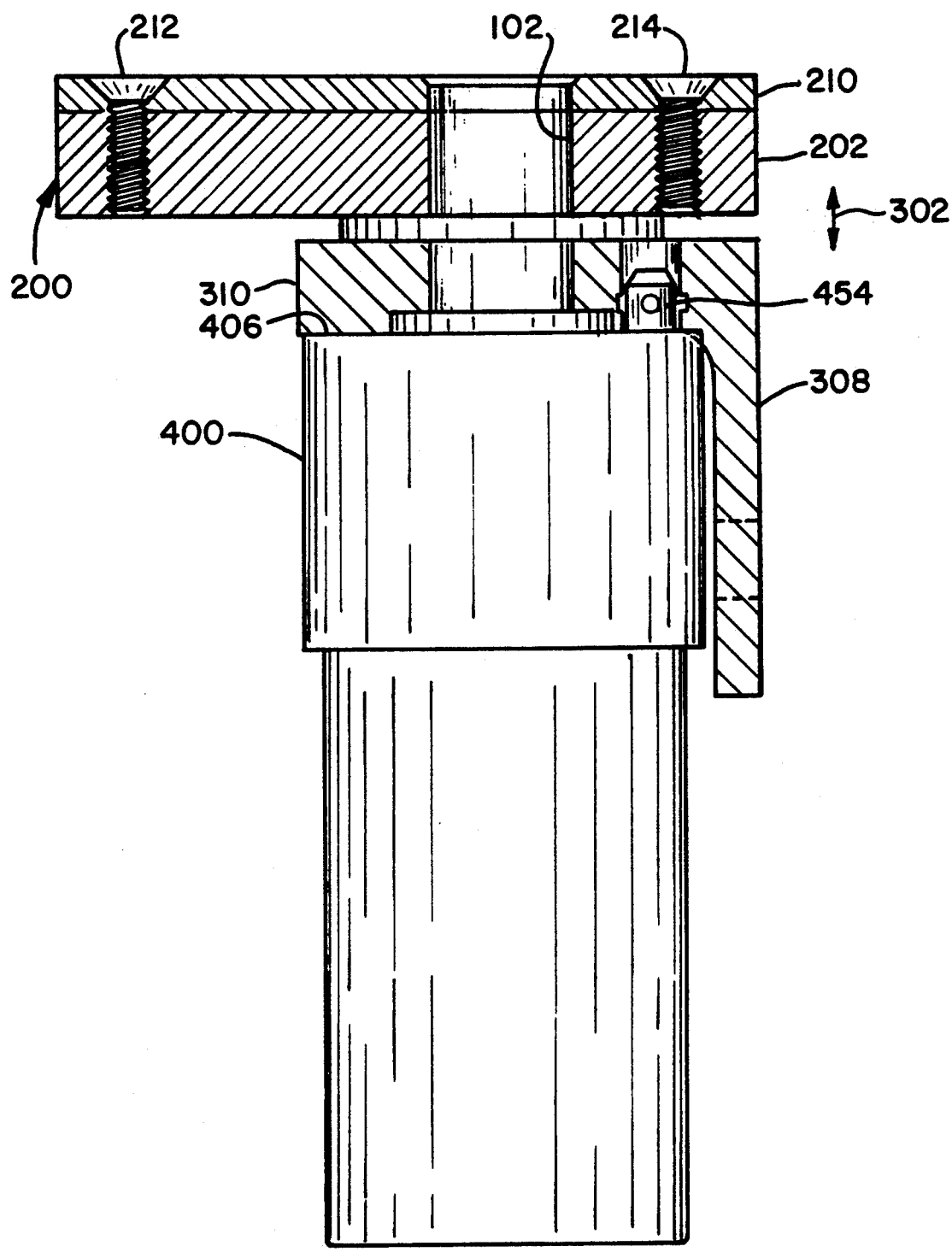
FIG. 3 is a partially sectioned view of the apparatus, taken along line 3—3 of FIG. 2.

FIGS. 1, 2, and 3 show the base assembly 200 and jacking assembly 300 in greater detail. The frame portion 202, although generally horizontal, has a pair of lateral lobes 218 from which a pair of substantially cylindrical, hollow sleeves 220 descend vertically on either side of the center line 18' (which is an extension of the tube axis 18). The lobes 218 are typically attached to the frame 202 by means of screws 216 or the like, as shown in FIG. 2. It should be appreciated that the illustrated embodiment is left and right symmetric about the center line 18', so that a description directed to structure on one side of the center line applies as well to corresponding structure on the other side of the center line. The fingers 204 are preferably situated forward relative to a line which passes through the center line 18' and the vertically oriented axes 2201 of the sleeves 220. The base assembly 200 may also include a top plate 210 secured by bolts 212, 214 which covers, for example, the screws 216 by which the lobes 218 are connected to frame member 202.

It should be appreciated that, once the fingers 204 have engaged respective tubes in the tube sheet and the target tube end 14' has been telescopically received within the aperture 102 formed coaxially about the apparatus center line 18', all the components of the base assembly, (i.e., all components in the 200 series of numeric identifiers), remain stationary.

The jacking assembly 300 includes a pair of spaced apart outer cylinders 304, 306 adapted to slide over the internal cylinders 220. The two outer cylinders 304, 306 are connected together, preferably integrally, by a yoke 308, so that the outer cylinders and yoke can move toward and away from the tube sheet in unison. The yoke 308 includes a bearing shoulder 310 which, as shown in FIG. 3, extends over and bears on the upper end or surface 406 of the gripper assembly 400.

Each outer cylinder 304, 306 is closed at the lower end except for a bolt or the like 314 which passes through the end to engage an inner piston 312, i.e., the piston 312 is within the inner cylinder, or sleeve, 220. The upper end of piston 312 is formed as a piston head 316 and includes a ring seal 318 for sliding against the inner surface 228 of sleeve 220. At the lower end of sleeve 220, a seal mounting ring 222 is threaded to sleeve 220 and includes another seal ring 224 which bears against the piston 312. A fluid input port 226, preferably for high pressure oil is formed in frame 218 for supplying fluid under a first variable pressure at the head 316 of piston 312. In this manner, the piston 312 and the outer cylinder 306 can be extended away from the tube sheet while sliding along stationary sleeve 220. A seal 232 can optionally be provided between the sleeve 220 and cylinder 306 to wipe the surfaces clean in use. Retraction can be accomplished via port 336, through which other fluid pressure (e.g., pneumatic) is transmitted within hollow piston 312. A coil spring member 334 can be situated between the ring 222 and the head 316 such that, upon release of the actuating fluid pressure, the piston 312 and outer cylinder 306 are retracted to the position shown in FIG. 1. Fluid is exhausted out of the chamber formed by sleeve surface 228, in a conventional manner.

It can be appreciated that the jacking assembly 300 does not directly engage the projecting tube 14'. The bearing shoulder 310 on yoke 308 of the jacking assembly includes a central bore as a continuation of the bore 102 for receiving the tube end 14', but does not otherwise engage the tube. The tube engagement is accomplished by the gripper assembly 400, which is situated within the yoke 308, in particular beneath bearing shoulder 310, and is affixed thereto so as to move in unison away from and toward the tube sheet, as the cylinders 304, 306 are extended and retracted.

Figure 4:
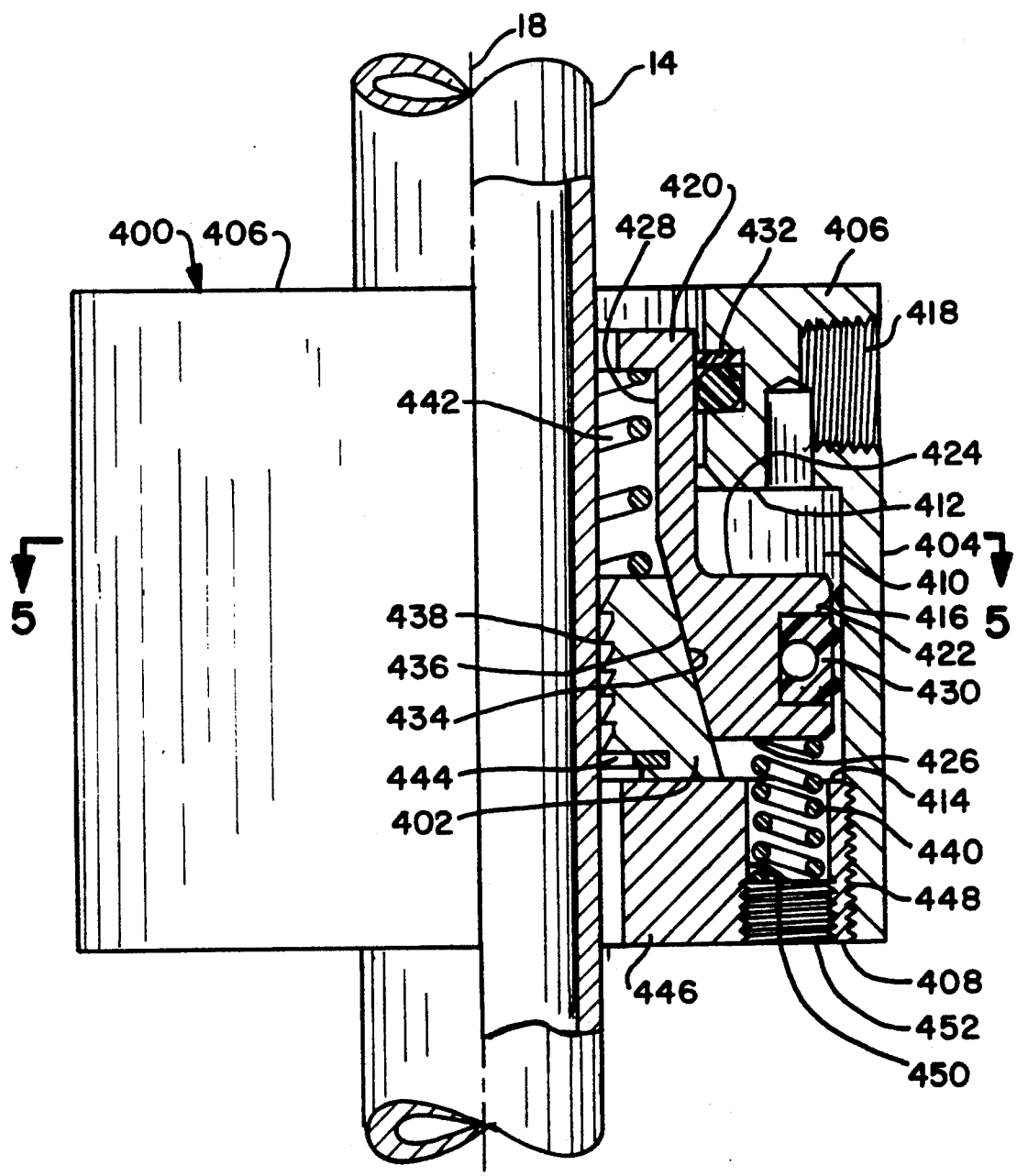
FIG. 4 is a detailed view, partially in section, of the gripper assembly portion of the apparatus shown in FIG. 1.
Figure 5:
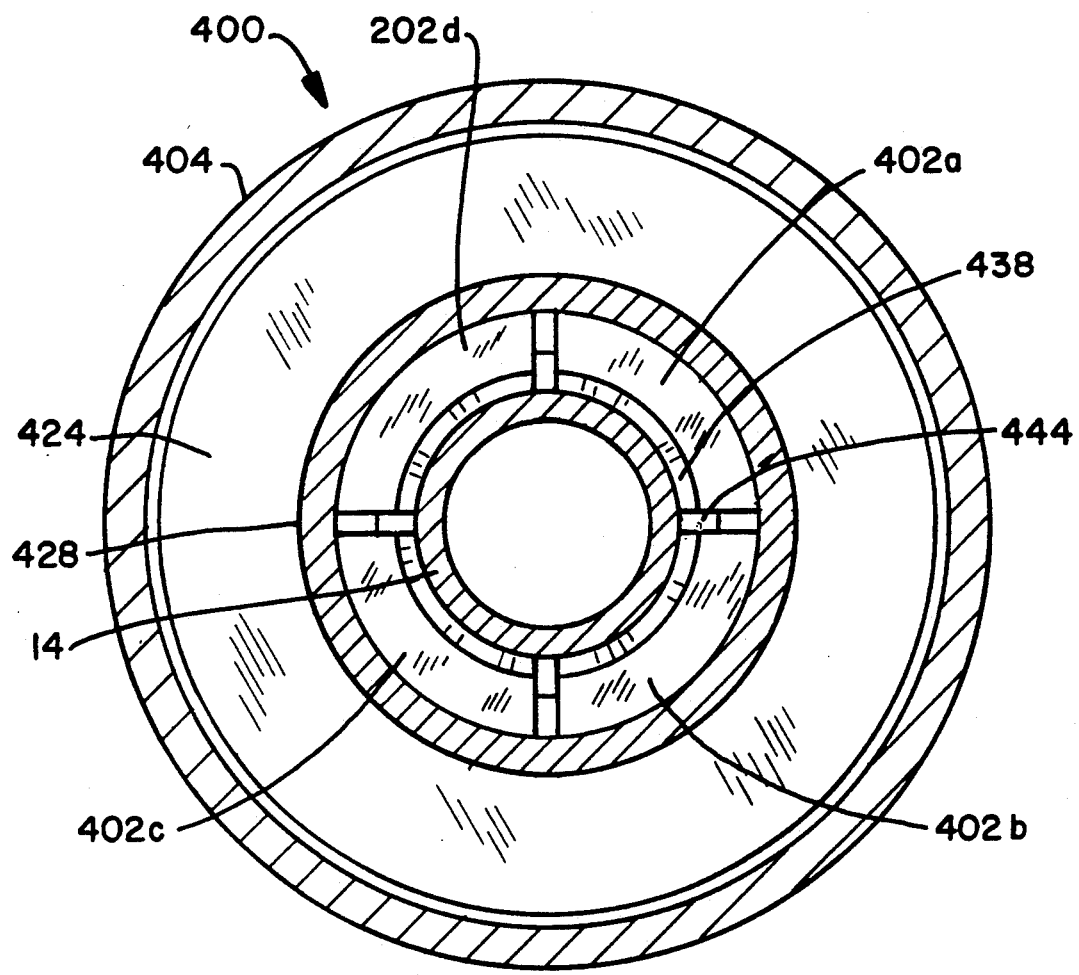
FIG. 5 is a cross-section view of the gripper assembly, taken along line 5—5 of FIG. 4.

FIGS. 4 and 5 show the preferred embodiment of the gripper assembly 400, the left side corresponding to the exterior of the gripper assembly as shown in FIG. 1, and the right side showing a longitudinal section view. The gripper assembly 400 includes a substantially annular housing 404 having first and second longitudinal ends 406, 408. A substantially annular groove or similar structure 410, defines a piston chamber. In the illustrated embodiment, the grove 410 has first and second spaced apart surfaces 412, 414 oriented transversally to the tube axis, and a third surface 416 extending between the first and second surfaces in parallel with the axis, thereby defining a gripper piston chamber between the first and second ends of the housing. A fluid inlet port 418 is formed at the first end 406 and extends in fluid communication with the piston chamber 410, whereby a second variable pressure fluid (preferably pneumatic) can be introduced into the chamber.

A gripper piston member 420 is adapted to move longitudinally in the housing 404, in response to the second fluid pressure in the chamber 410. The piston member 420 preferably includes a substantially annular body portion 422 situated in the chamber 410 and having a first surface 424 oriented transversally to the axis 18 and in juxtaposition to the housing first surface 412. A second surface 426 is oriented transversally to the axis and in juxtaposition to the housing second surface 414. The piston member 420 preferably includes a neck portion 428 extending rigidly from the body portion 422 between the housing first surface 412 and the tube axis. A first piston seal means 430 is situated between the body portion 422 and the housing third surface 416, and a second piston seal means 432 is situated between the neck portion 428 and the housing first end 406.

At least one gripper member 402 faces the tube axis 18 and is supported between the piston body portion 422 and the housing second end 408, for moving toward the axis to engage and grip the tube in response to the movement of the piston member 420 toward the second end 408 of the housing when the second fluid pressure increases in the piston chamber 410. Preferably, the gripper member 402 has an inclined surface 434 which mates with an inclined surface 436 on the piston member body portion 422, coacting in a wedge-like effect, such that as the body portion 422 is displaced downwardly, a radially inward force is applied through the mating surfaces to displace the gripper member 402, thereby engaging the tube. Preferably, the radially innermost surface 438 of the gripper member is serrated to more strongly engage the tube.

The piston member 420 is fluidly actuated only in the direction from the first end 406 toward the second end 408 of the housing to effectuate the gripping of the tube. Upon release or decrease of the fluid pressure in the chamber 410, it is preferred to relax the piston member 420 by a return spring 440 situated between the second end 408 of the housing and the surface 426 of the piston body portion. This can be accomplished by providing a bore 450 and associated set screw 452 for compressing the spring 440. Moreover, the second end 408 of the housing is preferably formed by an end plate or ring member 446 which threadably engages the cylindrical portion of the housing as shown at 448. This lower ring also provides a support surface on which the gripper member 402 rests and can slide radially toward and away from the tube.

A coaxial coil spring 442 is provided between the upper end of the gripper member 402 and a shoulder or flange formed in a radially inward direction at the upper end of neck portion 428 of piston member 420. This spring helps hold down the gripper member 402 when chamber 410 is pressurized and, more generally, helps stabilize the gripping member 402 by contributing to the "cradling" support of the gripper member along with the inclined surface 436 of the piston member and the upper surface of the housing end plate 446.

Preferably the gripper member 402 is in the form of a plurality, preferably three or four segmented pieces 402a, 402b, 402c, and 402d which are connected together by a circular spring 444 or the like. The spring prevents the individual segments from dropping out of the assembly 400 in the absence of a tube therein, yet is sufficiently flexible to permit each gripper segment 402 to move somewhat independently of the other gripper segment, thereby effectuating the maximum balanced gripping engagement against the tube.

With reference also to FIG. 3, it can be appreciated that as the yoke 308 and bearing shoulder 310 are extended via actuation of the first fluid pressure in the jacking assembly 300, the bearing shoulder 310 pushes down on the upper end or jacking surface 406 of the gripper assembly 400. When the jacking assembly is retracted, the gripper assembly 400 is also retracted along with it, by virtue of the connection between the bearing shoulder 310 and the gripper housing 404. This connection is preferably provided by a plurality, for example three, spring loaded pins 454, which are also evident in FIG. 2.

It should be appreciated that other forms of the invention may be utilised without departing from the spirit and scope of the appended claims. For example, the jacking assembly could have a single, annular piston situated coaxially above the gripper assembly 400. The jacking assembly pistons 304, 306 could be implemented in an alternative manner, in which each outermost cylinder is connected to and remains stationary relative to the base assembly 200, with the internal piston and end cap connected to the piston, movable relative to the outer cylinder. In such embodiment, the end cap could be connected to or integral with a yoke spanning the cylinders, to which the gripper assembly would be mounted by analogy to the embodiment illustrated herein.

In another modification, the receiving aperture 102 in the base assembly 200 and the yoke member 308, could alternatively take the form of a notch or cut-out, whereby the projecting tube could be engaged laterally immediately prior to entry of the tube end into the gripper assembly 400. Moreover, the inventive apparatus can be used to grip a rod, rather than a tube.

It should also be appreciated that the base assembly 200 as illustrated in FIG. 1 can be understood as engaging the tube sheet during operation, in two respects. First, the fingers 204 are expanded into strong interference engagement with the tubes at the tube sheet, and secondly, the top plate 210 contacts the tube sheet and spreads the considerable reaction force required to pull the tube, over a relatively wide surface of the tube sheet. In other implementations, one or the other of the fingers 204 or top plate 210 could be eliminated, or not necessarily contact the tube sheet or equivalent plate, while still practising the invention.

I claim:

1. In combination with a tube sheet containing tube ends each having an inside surface and a projecting tube having a tube longitudinal axis, apparatus for pulling said projecting tube from said tube sheet, along said tube longitudinal axis, comprising:

base means engaging the inside surface of said tube ends of said tube sheet;

a jacking assembly mounted on the base means and actuable by a first fluid pressure variation between extended and retracted positions away from and toward the base means, respectively;

a substantially annular gripper assembly connected to the jacking assembly for extended and retracted movement therewith and adapted to receive the tube coaxially about said tube longitudinal axis, the gripper assembly including, a housing having a gripper piston chamber and means in fluid communication with the gripper piston chamber, whereby a second fluid pressure variation can be introduced into the gripper piston chamber, gripper piston means for movement in the gripper piston chamber in response to the second fluid pressure in the chamber, the gripper piston means including a substantially annular body portion having a bearing surface facing said tube longitudinal axis, gripper means supported in contact with the body portion bearing surface, for movement toward said tube longitudinal axis to engage and grip the tube in response to the movement of the gripper piston means when the second fluid pressure increases in the gripper piston chamber; and first and second fluid pressure ports associated respectively with the jacking assembly and the gripper assembly, whereby the gripper piston can be actuated and the jacking assembly extended to grip and pull the tube.

2. The apparatus of claim 1, wherein the jacking assembly includes two laterally spaced apart, fluidly actuable jacking piston means each having a movable member which moves between said extended and retracted positions and a yoke rigidly connected between and movable with said movable member; and the gripper assembly is rigidly connected to the yoke for movement therewith.

3. The apparatus of claim 2, wherein each jacking piston means includes a movable outer cylinder to which the yoke is connected.

4. Apparatus for engaging and then pulling a projecting rod having a longitudinal axis through a rod support plate along the rod longitudinal axis, comprising:

base means for engaging said support plate;

a jacking assembly mounted on the base means and actuable by a first fluid pressure variation between extended and retracted positions away from and toward the base means, respectively;

a substantially annular gripper assembly connected to the jacking assembly and adapted for engaging the rod coaxially about said rod longitudinal axis, the gripper assembly including, a housing having first and second longitudinal ends, first and second spaced apart surfaces oriented transversely to the rod longitudinal axis and a third surface extending between the first and second surfaces in parallel with the rod longitudinal axis so as to define a substantially annular gripper piston chamber between the first and second ends of the housing, conduit means in fluid communication with the gripper piston chamber, whereby a second fluid pressure variation can be introduced into the gripper piston chamber, gripper piston means for displacement within the housing in response to the second fluid pressure in the piston chamber, the gripper piston means including a substantially annular body portion situated in the chamber and having a first piston surface oriented transversely to the rod longitudinal axis and in juxtaposition to the housing first surface, a second piston surface oriented transversely to the rod longitudinal axis and in juxtaposition to the housing second surface, a neck portion extending rigidly from the body portion between the housing first surface and the rod longitudinal axis, a first piston seal between the body portion and the housing third surface, and a second piston seal between the neck portion and the housing first end, gripper means facing the rod longitudinal axis and supported between the body portion and the housing second end, for displacement toward the rod longitudinal axis to engage and grip the rod in response to the displacement of the gripper piston toward the second end of the housing when the second fluid pressure increases in the gripper piston chamber; and first and second fluid pressure ports associated respectively with the jacking assembly and the gripper assembly, whereby the gripper piston can be actuated and the jacking assembly extended to grip and pull the rod.

5. The apparatus of claim 4, wherein the gripper assembly includes means for biasing the gripper piston body portion toward the first surface of the gripper piston chamber, such that the gripper piston means retracts at least partially upon decrease of the second fluid pressure.

6. The apparatus of claim 4, wherein the gripper piston body portion and the gripper means have abutting, inclined mating surfaces oriented such that fluid pressure-actuated displacement of the body portion urges the gripper means toward the rod longitudinal axis.

7. The apparatus of claim 4, including means situated between the piston neck portion and the gripper means, for biasing the gripper means into contact with the housing second end as the piston means is displaced toward the housing second end.

8. The apparatus of claim 5, including means situated between the piston neck portion and the gripper means, for biasing the neck portion toward the housing first end and the gripper means torward the housing second end.

9. The apparatus of claim 8, wherein the gripper means comprises a plurality of spaced apart gripper segments connected together adjacent the rod longitudinal axis by a semi-rigid ring, each segment having an inclined surface that mates with an inclined surface on the gripper piston body portion and oriented such that fluid pressure-actuated displacement of the body portion urges each gripper segment toward the rod longitudinal axis.

10. A pneumatically actuated tube gripper apparatus, comprising:

a substantially annular housing defining a central longitudinal axis along which the tube is to enter the apparatus, the housing having, first and second longitudinal ends, a substantially annular groove intermediate the ends, the groove having first and second spaced apart surfaces oriented transversely to said longitudinal axis and a third surface extending between the first and second surfaces in parallel with said longitudinal axis so as to define a piston chamber between the first and second ends of the housing, fluid inlet means formed at the first end and extending into fluid communication with the piston chamber, whereby fluid at controlled pressure can be introduced into the piston chamber;

piston means for displacement in the housing in response to the fluid pressure in the chamber, the piston means including, a substantially annular body portion situated in the chamber and having a first surface oriented transversely to said longitudinal axis and in juxtaposition to the housing first surface, and a second surface oriented transversely to said longitudinal axis and in juxtaposition to the housing second surface, a neck portion extending rigidly from the body portion between the housing first surface and said longitudinal axis, a first piston seal between the body portion and the housing third surface, and a second piston seal between the neck portion and the housing first end; and gripper means facing said longitudinal axis and supported between the body portion and the housing second end, for displacement toward said longitudinal axis to engage and grip the tube, in response to the displacement of the piston means toward the second end of the housing when the fluid pressure increases in the piston chamber.

11. The apparatus of claim 10, including means for biasing the piston toward the housing first end, such that the gripper piston retracts at least partially upon decrease of the fluid pressure.

12. The apparatus of claim 10, wherein the piston body portion and the gripper means have abutting, inclined mating surfaces oriented such that fluid pressure actuated displacement of the body portion urges the gripper means toward said longitudinal axis.

13. The apparatus of claim 10, including means situated between the piston neck portion and the gripper means, for biasing the gripper means into contact with the housing second end, as the piston means is displaced towards the housing second end.

14. The apparatus of claim 11, including means situated between the piston neck portion and the gripper means, for biasing the neck portion toward the housing first end and the gripper means toward the housing second end.

15. The apparatus of claim 14, wherein the gripper means comprises a plurality of spaced apart gripper segments connected together adjacent said longitudinal axis by a semi-rigid ring, each segment having an inclined surface that mates with an inclined surface on the gripper piston body portion and oriented such that fluid pressure-actuated displacement of the body portion urges each gripper segment toward said longitudinal axis.

16. The apparatus of claim 15, wherein the housing includes a cylindrical wall defining the third housing surface and the housing second end includes a ring that is threadable along the cylindrical wall and which defines the housing second surface.

17. The apparatus of claim 16, wherein the gripper segments abut the housing second surface defined by said ring.

* * * * *